Dec. 30, 1941.   F. B. DOYLE   2,267,900
VACUUM APPARATUS
Filed July 13, 1939   2 Sheets-Sheet 2

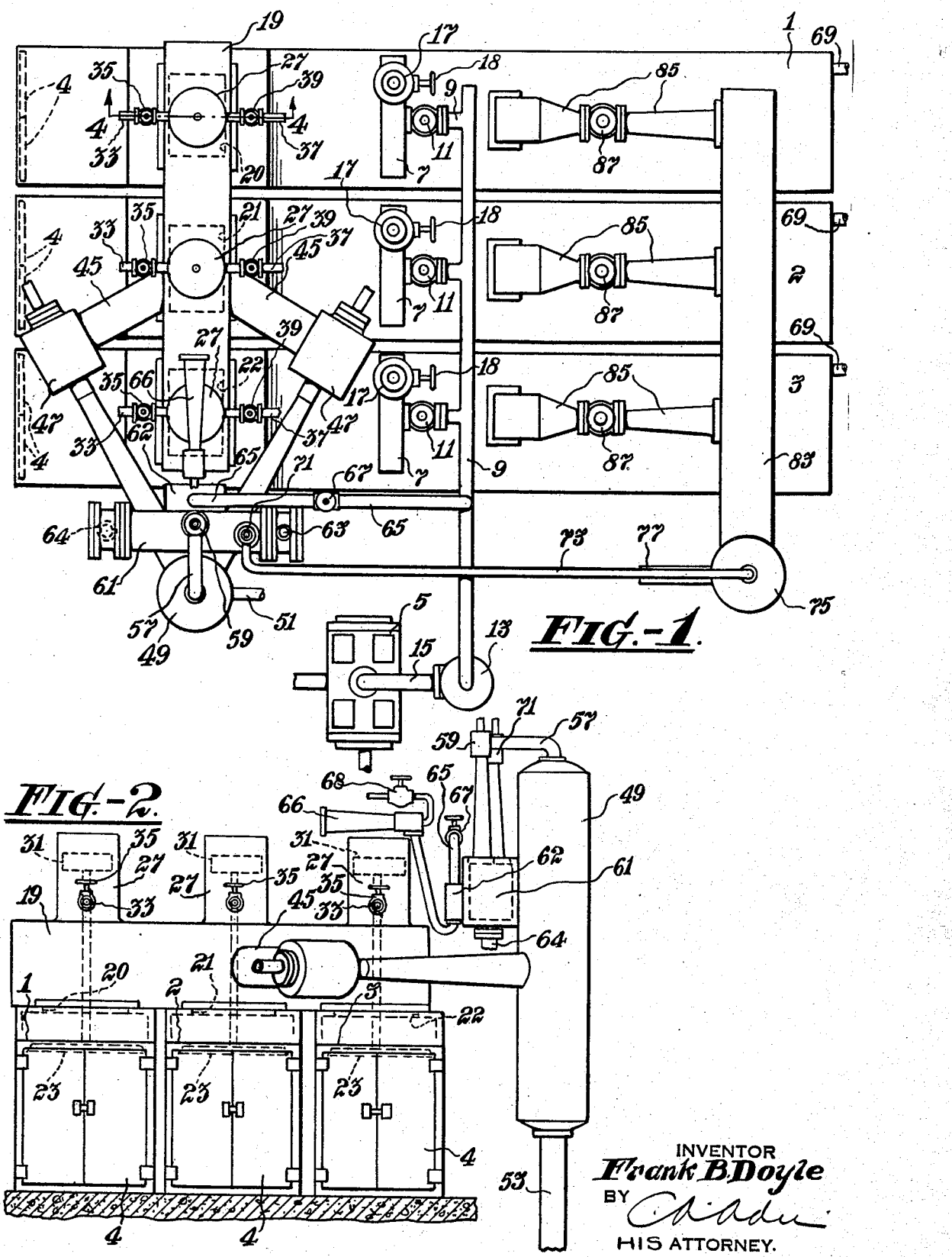

INVENTOR.
Frank B. Doyle.
BY
HIS ATTORNEY.

Patented Dec. 30, 1941

2,267,900

UNITED STATES PATENT OFFICE 2,267,900

VACUUM APPARATUS

Frank B. Doyle, Phillipsburg, N. J., assignor to Ingersoll-Rand Company, Jersey City, N. J., a corporation of New Jersey Application July 13, 1939, Serial No. 284,285

9 Claims. (Cl. 131—133)

This invention relates to apparatus for processing organic material and, more particularly, to an apparatus wherein a multiplicity of processing chambers may be selectively evacuated by one evacuating means.

In the processing of organic material such as tobacco, food, etc., it is often desirable to remove all air and gases that may be intermingled with the material. To this end, the material is subjected to a vacuum or low absolute pressure treatment preliminary to or as a part of a process. In order to subject the material to the vacuum treatment, it is customary to place the material to be processed in a chamber and to evacuate the chamber. Whenever a large quantity of material is to be processed, several such chambers are necessary and evacuating apparatus must be furnished with each chamber with the result that complicated and expensive apparatus is necessary.

Accordingly, it is an object of the present invention to provide an apparatus for processing organic material wherein several chambers are provided.

A further object is to provide an apparatus for processing organic material wherein a single evacuating means may be successively employed to evacuate a multiplicity of chambers.

Still another object is to provide an apparatus for processing organic material wherein primary, secondary and tertiary evacuators may be successively employed to evacuate a plurality of processing chambers.

Another object is to provide an apparatus for processing organic material wherein means are provided to enable each processing chamber to communicate with an evacuating chamber.

A further object is to provide an apparatus for the treatment of organic material wherein the evacuating means may be employed with a plurality of treating chambers and two or more chambers may be subjected to different stages of evacuation at the same instance.

These and other objects will be apparent from the following description of which the drawings form a part and wherein like numerals refer to similar parts.

Figure 1 is a top-plan view of an apparatus constructed in accordance with the principles of this invention.

Figure 2 is an end elevational view of the apparatus shown in Fig. 1.

Figure 3:
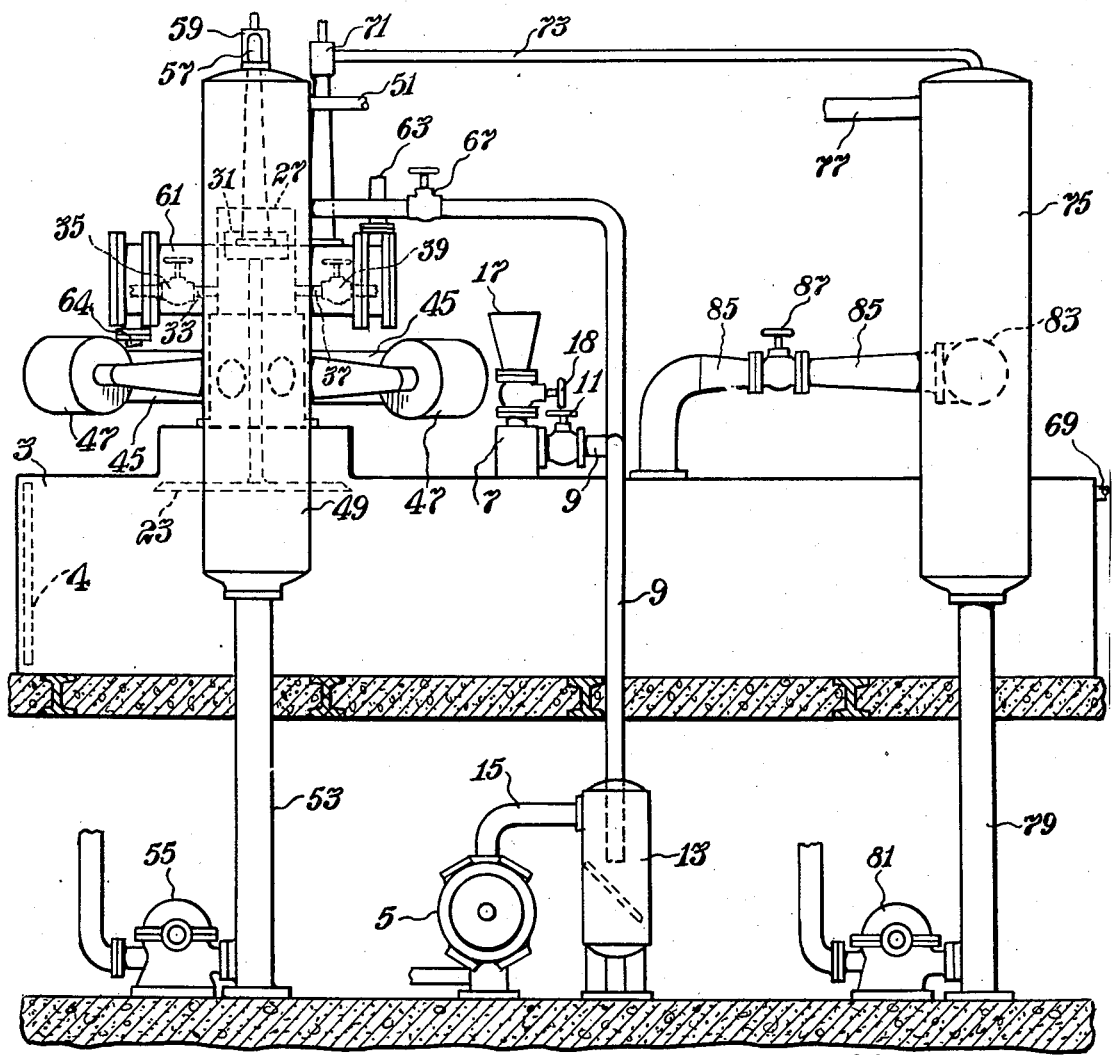
Figure 3 is a side elevational view of the apparatus illustrated in Fig. 1.

With reference to Fig. 1, the apparatus, as shown, comprises three processing chambers, 1, 2 and 3 which are entirely independent of each other. Each chamber is provided with doors 4 through which the chambers may be loaded and unloaded. Associated with the chambers 1, 2 and 3 is a vacuum pump 5 serving to selectively remove air and foreign gaseous material from the processing chambers. Each chamber has a connection 7 with which a conduit 9 is associated. Between each connection 7 and the conduit 9 is a valve 11 to control communication between the conduit 9 and the connection 7. The connections 7 open directly to the interior of the respective processing chambers. The conduit 9 leads to a separator 13 to remove any moisture entrained in the air. The separator 13 is connected to the vacuum pump 5 by the conduit 15. With this arrangement, when a valve 11 is opened, the respective chamber with which the valve is associated may be evacuated by the vacuum pump 5 through connection 7, the conduit 9, the separator 13 and the conduit 15.

Mounted on each connection 7 is a vacuum breaker 17 which will admit air to the respective chamber when valve 18 is opened. Some such device is necessary in order that the material in the chamber may be removed after the chamber pressure has been reduced to a low absolute pressure and the material has been completely processed.

To one side of the connection 7 is an evacuating chamber or header 19. The header 19 is entirely closed but communicates with the chambers 1, 2 and 3 through ports 20, 21 and 22. These ports are each provided with a pneumatically operated damper 23.

Figure 4:
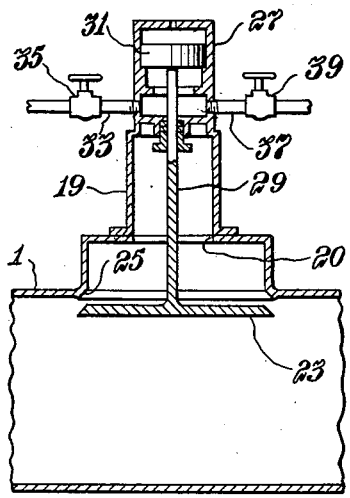
Figure 4 is a view taken along line 4—4 of Figure 1.

The details of the damper arrangement are shown in Fig. 4. When the damper 23 is in the closed position, it rests against the seat 25 provided within the chamber 1. In order to hold the damper closed the piston cylinder 27, mounted on the header 19, is utilized. A rod 29 connects the piston 31 and the damper 23. Air, or some other actuating medium, is admitted under the piston by the conduit 33 controlled by valve 35. Accordingly, when it is desired to close the damper 23, valve 35 is opened and air admitted under the piston to raise it. An atmospheric vent 37, controlled by valve 39, is provided to prevent the piston 31 from opposing the opening of the damper 23. Normally, the damper is held closed by the difference in pressure existing between chamber 1 and the header 19, assisted by air admitted through valve 35 and acting on the bottom of the piston 31. Under certain conditions, as will be explained hereinafter, the pressure in header 19 and the pressure in any one of the chambers 1, 2 or 3, will be equalized. If at such time the valve 35 is closed and valve 39 is open to vent the air under piston 31, the damper 23 will remain closed and will open and permit communication between chamber and the header only upon equalization of pressure in the header and respective chamber.

On either side of the header 19 are ducts 45 through which the evacuators 47 may withdraw fluid from any chamber in which the respective damper is open through the header 19. The evacuators 47 are ordinary commercial steam ejectors and will not be described in detail.

To receive the discharge from the evacuators 47, a barometric condenser 49 is provided. The condenser 49 is cooled by cooling water supplied through conduit 51 and is removed from the condenser along with condensed moisture through conduit 53 by the pump 55. When these evacuators are operating, they will discharge the actuating steam and any fluid removed from the chambers through the header 19. At the top of the barometric condenser is a conduit 57 through which the steam evacuator 59 may withdraw any uncondensable fluids entering the condenser 49 and discharge them to a condenser 61. Cooling water is supplied to the condenser 61 through conduit 63 and is removed therefrom by conduit 64.

Associated with the condenser 61 is an outlet box 62 which is connected by conduit 65 to the conduit 9 leading to the separator 13 and a vacuum pump 5. Communication between vacuum pump 5 and the outlet box 62 through conduit 65 is controlled by valve 67. By means of this arrangement, the pressure between the header 19 and any processing chamber may be equalized.

For the purposes of this description the vacuum pump 5 may be designated as the primary, or first stage, evacuator; the evacuator 59 as the secondary, or second stage, evacuator; and, the evacuator 47 as the tertiary, or third stage, evacuator. Thus, if it is desirable to evacuate chamber 1, assuming the valve 35 for chamber 1 is open and the respective valve 39 is closed, so that the damper 23 is held closed, valve 11 is opened to enable the vacuum pump 5 to remove gaseous vapors from the chamber 1. When the pressure within the chamber has been reduced to a point where the vacuum pump has become relatively inefficient, valve 35 is closed while the valves 39 and 67 are opened.

The effect of opening valve 67 is to equalize the pressure in header 19 with the pressure in chamber 1, as there is open communication between chamber 1, header 19 and the vacuum pump 5. The chamber 1 is connected with the header 19 by the conduit 65 communicating with the outlet box 62 which is connected to the condenser 49 by evacuator 59; and the condenser 49 connects with the header 19 by means of the evacuator 47 and ducts 45. When the evacuators 59 and 47 are both inactive, they act as conduits so that the vacuum pump 5 could, when valve 67 is open, withdraw fluid from the header 19, if the pressure in header 19 should exceed the pressure in chamber 1. When the pressures are the same the valve 11 is closed.

Upon substantial equalization of the pressure in header 19 with the pressure in chamber 1, the damper 23, for chamber 1, is opened by gravity, thus enabling evacuator 59, which is then actuated, to withdraw vapor from the chamber 1. The path followed by the vapor as it is drawn from the chamber 1 by evacuator 59 is through ducts 45, the evacuators 47, which act as conduits, through the barometric condenser 49 and the conduit 57.

The discharge from evacuator 59 is delivered to the after condenser 61 wherein any uncondensable vapors may be withdrawn from the condenser 61 through the outlet box 62, provided with the steam ejector 66, arranged to discharge to atmosphere in order that the pressure in condenser 61 may not increase and interfere with the operation of the apparatus. The operation of this ejector 66 is controlled by valve 68 placed in a steam supply conduit for the ejector.

After the pressure in chamber 1 falls to a value where the evacuator 59 becomes inefficient, it becomes necessary to use the evacuators 47. The evacuators 47 withdraw vapor from the chamber 1 through the ducts 45 and discharge it to the barometric condenser 49. Meanwhile the evacuator 59 is operative to remove uncondensed vapors from the barometric condenser. The effect of the evacuator 47 is to increase the suction pressure of the evacuator 59. In other words, the evacuators 47 act as boosters for the evacuator 59.

In processing certain materials, such as tobacco, it is desirable to remove all gases intermingled with the tobacco by subjecting it to a low absolute pressure and to thereafter moisten the material by injecting steam. This is accomplished by means of introducing live steam through conduit 69 to the chamber.

When sufficient steam has been supplied to the chamber, the steam supply is shut off and the chamber is re-evacuated. Apparatus apart from that previously described is utilized for this purpose and consists of another steam evacuator 71 arranged to discharge to the condenser 61. Vapor is withdrawn by this evacuator from the barometric condenser 75 through conduit 73. Cooling of the condenser 75 is accomplished by supplying cooling water thereto by conduit 77 and removing water therefrom by conduit 79 and pump 81. Communication between the condenser 75 and each chamber is through header 83 provided with branches 85 opening into each chamber. A valve 87 is provided in each conduit 85 so that the chamber to be re-evacuated may be selected. Thus, by operating evacuator 71 and opening the respective chamber valve 83 for chamber 1 this chamber may be re-evacuated.

For a better understanding of the apparatus, the operation of the apparatus as a whole will now be described.

Assume, for instance, that chamber 1 is loaded with tobacco to be treated and its doors are closed. The vacuum pump 5 is then started and valve 11, for chamber 1, is opened to allow the vacuum pump 5 to evacuate chamber 1. When the vacuum pump 5 has reduced the pressure in chamber 1 to the pressure for which the pump is designed, valve 67 is opened and thereafter when the pressure in header 19 and chamber 1 is the same the valve 11 for chamber 1 is closed. It is customary prior to commencing operation of the apparatus to operate the ejector 66 for a period of time in order to reduce the pressure in the condensers and also in the header 19. Under these conditions the pressure in the header is normally reduced to a pressure below that which can be obtained by the vacuum pump 5. As has been explained, the effect of opening valve 67 under these conditions is to equalize the pressure in the header 19 with the pressure in chamber 1. When these pressures are equalized, the damper 23 will open, provided that valve 35 is closed and valve 39 is open. Thereafter, evacuator 59 is actuated and, at the same time, valve 67 is closed. As soon as valve 67 is closed, the valve 11, provided for chamber 2, may be opened, in order that the vacuum pump 5 may then evacuate chamber 2. After evacuator 59 has reduced the pressure in chamber 1 sufficiently, the evacuators 47 are actuated and they reduce the pressure in chamber 1 to the final, or desired, pressure.

Upon reaching this final pressure, the valve 35 for chamber 1 is opened and the respective valve 39 is closed, in order that the damper 23 for chamber 1 may be closed. The steam supply to the evacuators 47 and 59 is then shut off in order to render these evacuators inoperative. When this has been done, chamber 1 is ready for steaming. During the time that chamber 1 is being evacuated by evacuators 59 and 47, chamber 2 has been evacuated by vacuum pump 5 and is now ready to be evacuated by evacuators 59 and 47. When evacuators 47 and 59 are shut down, the header 19 would be subjected to the pressure in the condensers which is considerably greater than the pressure in chamber 2 were it not for the ejector 66 which operates continually. In order to equalize the pressures in chamber 2 and header 19 the valve 67 must again be opened. The damper 23 for chamber 2 will open in the same manner as the damper 23 for chamber 1 was opened.

The same procedure for evacuating chamber 2, as was used with chamber 1, is then followed. In the mean time, chamber 1 is being steamed by admitting steam thereto through pipe 69. After steaming is completed, chamber 1 may be evacuated by the evacuator 71 and steamed again, if desired. Or, the vacuum breaker valve 85, for chamber 1, may be opened so that the pressure in chamber 1 will be returned to atmospheric pressure and the material treated may then be removed through door 4 and the chamber may be reloaded with more material to be treated.

It is readily apparent that, during evacuation of chamber 2 by the evacuators 47 and 59, the vacuum pump may be evacuating chamber 3. The material in each of the chambers is treated in the same way as the material in chamber 1.

With this arrangement, it is possible to subject each chamber to a different step of the processing and, ordinarily, one chamber will constantly be open for loading and reloading. Thus, the first, second and third stage evacuators may be utilized to evacuate chamber 2, for instance, while chamber 1 is being steamed and evacuated by evacuator 71. At the same time, of course, the chamber 3 may be unloaded and reloaded with material to be processed. When chamber 3 is loaded, chamber 2 may be steamed, while chamber 1 is being unloaded and the first, second and third stage evacuators may be used to evacuate chamber 3.

It is obvious that the apparatus may be controlled by an automatic control system instead of employing the manual means here shown. It thus appears that each chamber may be subject to a different step in the processing of the material and there is no need to supply a multiplicity of evacuating systems or steaming systems in order to handle material in more than one chamber.

I claim:

1. In an apparatus for processing tobacco and the like, the combination of a plurality of independent processing chambers to receive tobacco, primary evacuating means to selectively evacuate any chamber, a common chamber connected to each processing chamber, closing means to control communication between the common chamber and the respective processing chambers opening in response to an equalization of pressures in the common chamber and any processing chamber, separate means to close the closing means, means adapted to equalize the pressure of a chamber evacuated by the primary evacuating pump and the pressure in the common chamber, and secondary evacuating means to evacuate a chamber through the common chamber to a lower absolute pressure than the primary evacuating means when the closing means is open.

2. In an apparatus for processing tobacco and the like, the combination of a plurality of processing chambers, primary evacuating means to selectively evacuate any chamber, a common chamber connected to each processing chamber, closing means to control communication between the common chamber and the respective processing chambers adapted to open in response to an equalization of the pressures in the common chamber and any processing chamber, separate means to close the closing means, means adapted to equalize the pressure of a processing chamber evacuated by the primary evacuating means and the pressure in the common chamber, secondary evacuating means associated with the common chamber adapted to evacuate the processing chambers to a lower absolute pressure than the primary evacuating means, and a tertiary evacuating means associated with the common chamber adapted to evacuate the processing chambers to a lower absolute pressure than the secondary evacuating means.

3. In an apparatus for processing tobacco and the like, the combination of a plurality of processing chambers, primary evacuating means to selectively evacuate any processing chamber, common means associated with each processing chamber, means for each processing chamber to control communication with the common means adapted to open when there is substantial equalization of the pressures in the common means and any processing chamber, separate means to close the last said means, means to equalize the pressure in the common means and any chamber evacuated by the primary evacuating means, and a secondary and tertiary evacuating means for each chamber.

4. In an apparatus for processing tobacco and the like, the combination of a plurality of independent chambers to receive tobacco to be processed, an evacuating pump, conduits connecting the evacuating pump to each chamber, a valve in the conduits for each chamber to selectively connect any chamber with the evacuating pump, a header connected to each chamber, a damper for each chamber to control communication between the header and the chambers normally held closed by the difference in pressures between the header and the chambers and opening upon a substantial equalization of pressure between the header and any chamber, a pipe connecting the header and said conduits to equalize the pressure between the header and the conduits, a second valve in the pipe to control communication therethrough, constructed and arranged to the opened when a chamber has been evacuated by the evacuating pump to equalize the pressures and open the damper to the evacuated chamber, and a second stage and a third stage evacuator to further evacuate the evacuated chamber through said header when the respective damper is open.

5. In an apparatus for processing tobacco and the like, the combination of a plurality of independent chambers to receive tobacco to be processed, an evacuating pump, conduits connecting the evacuating pump to each chamber, a valve in the conduits for each chamber to selectively connect any chamber with the evacuating pump, a header connected to each chamber, a damper for each chamber to control communication between the header and the chambers normally held closed by the difference in pressures between the header and the chambers and adapted to open upon substantial equalization of the pressure in the header and the pressure in any chamber, a pipe connecting the header and said conduits to equalize the pressure between the header and any chamber, a second valve in the pipe to control communication therethrough, constructed and arranged to be opened when a chamber has been evacuated by the evacuating pump to equalize the pressures and open the damper to the evacuated chamber, a second stage and a third stage evacuator to further evacuate the evacuated chamber through said header when the respective damper is open, and a pneumatic device to close and hold said damper closed when the chamber has been fully evacuated.

6. In an apparatus for processing tobacco and the like, the combination of a plurality of independent chambers to receive tobacco to be processed, a vacuum pump, means to connect the vacuum pump to each chamber, means to selectively control communication between the vacuum pump and each chamber, a header connected to each chamber, a damper for each chamber opening in response to a substantial equalization of pressure between the header and the respective chamber, separate means to releasably maintain the damper closed, means connecting the first said means and the header to equalize the pressures therein, means normally closed to prevent communication through the last said means adapted to be opened when a chamber has been evacuated by the vacuum pump to equalize the pressures and open the damper to the evacuated chamber, a first steam jet exhauster, a second steam jet exhauster in communication with the header and serving as a conduit connecting the first steam jet exhauster with the header, and a third steam jet exhauster to reevacuate any chamber independently of the vacuum pump, and the first and the second steam jet exhausters.

7. In an apparatus for processing tobacco and the like, the combination of a plurality of processing chambers, hermetically sealed doors for each chamber opening to admit to and remove tobacco from the respective chamber, a vacuum pump, conduits connecting the vacuum pump to each chamber, a valve for each chamber in the conduit to selectively connect the vacuum pump to the chambers, a first common header independent of said conduits and opening into each chamber, a damper for each chamber to control communication between the first header and each chamber, a pneumatic controlling device for each damper, a first steam jet exhauster connected to the first header, a first condenser to receive the discharge of the first steam jet exhauster, a second independent header, pipes connecting the second header with each chamber, second valves in said pipes, a second steam jet exhauster, exhauster conduits connecting the second exhauster and the second header, a second condenser to receive the discharge of the second steam jet exhauster, a third steam jet exhauster to withdraw fluid from the first condenser and discharge it to the second condenser, and a steam supply conduit for each chamber.

8. In an apparatus for processing tobacco and the like, the combination of a plurality of processing chambers to receive the tobacco, a vacuum pump, means to selectively connect the vacuum pump to any chamber, a header connected to each processing chamber, a damper for each processing chamber to control communication with the header adapted to open upon a substantial equalization of the pressures in the header and the respective processing chamber, fluid responsive means to selectively hold the damper closed, a steam jet exhauster to evacuate any processing chamber wherein the damper is open through the header to a lower absolute pressure than the vacuum pump, a second steam jet exhauster to evacuate any processing chamber to a lower absolute pressure than the first said steam jet exhauster, condensing means to receive the discharge from both said exhausters, and means to introduce steam into a processing chamber.

9. In an apparatus for processing tobacco and the like, the combination of a plurality of independent processing chambers to receive the tobacco, a vacuum pump, means to selectively connect the vacuum pump to any chamber, a header connected to each chamber, a damper for each chamber to control communication with the header adapted to open when the pressure in a chamber is substantially equal to the pressure in the header, pressure equalizing means between the header and the first said means and a selected chamber, a fluid actuated piston associated with each damper, a cylinder for the piston, means to introduce a fluid under pressure to the cylinder to move the piston to close the damper, a steam jet exhauster to evacuate the header and any processing chamber wherein the respective damper is open, and a condenser to receive the discharge from the steam jet exhauster.

FRANK B. DOYLE.